UNITED STATES PATENT OFFICE 2,386,360

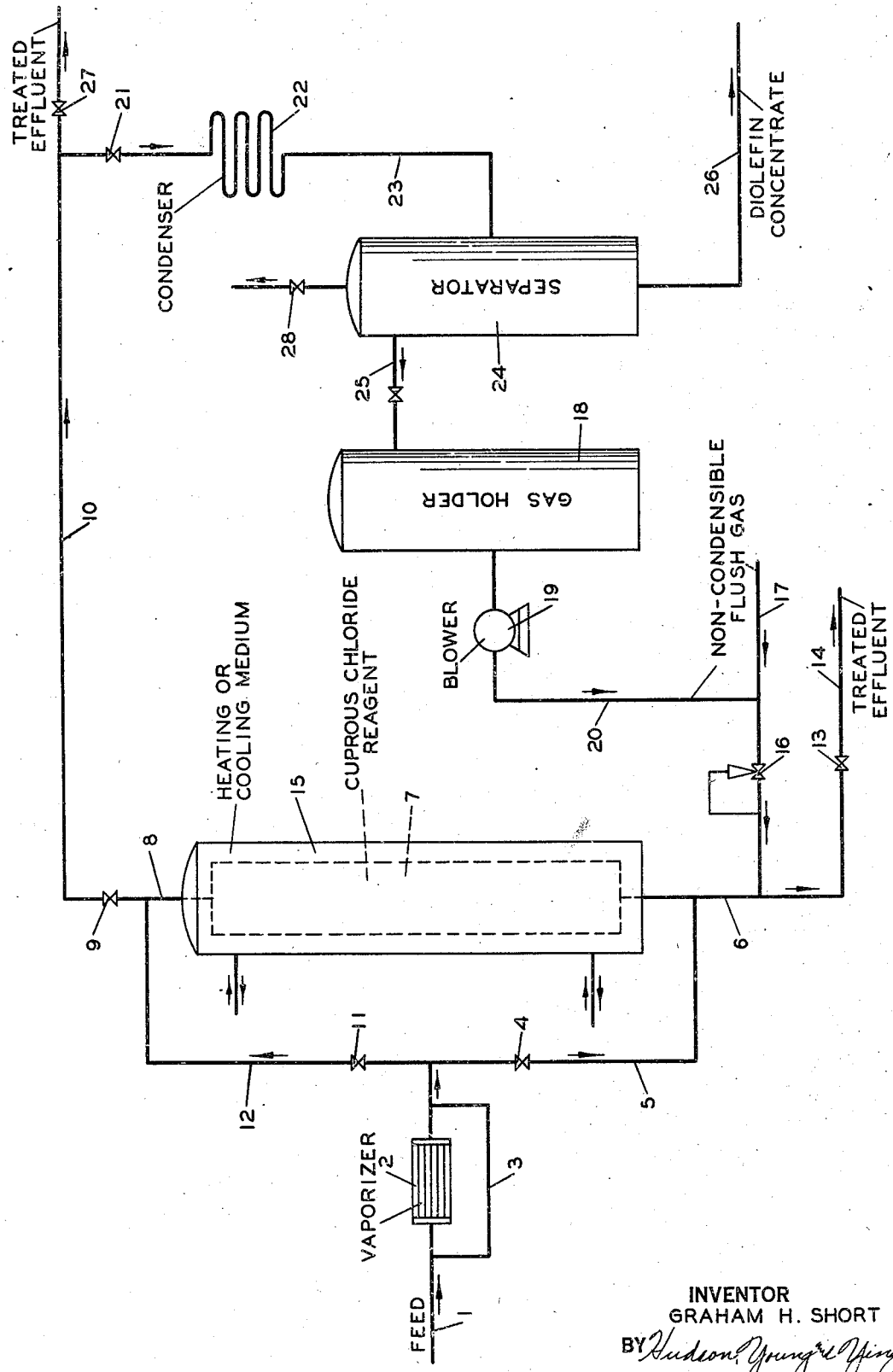

RECOVERY OF HYDROCARBONS

Graham H. Short, Bartlesville, Okla., assignor to Phillips Petroleum Company, a corporation of Delaware Application February 10, 1942, Serial No. 430,267

2 Claims. (Cl. 260—681.5)

This invention relates to an improved process for the recovery of hydrocarbons from hydrocarbon fluids containing the same and from metal salt complexes thereof. More particularly, it relates to an improved method for recovering diolefins in substantially pure state subsequent to selective chemical absorption from hydrocarbon fluids by means of metal salt reagents. Still more specifically, the present invention has application as a step in the process of isolating and/or purifying conjugated diolefin hydrocarbons of the butadiene type through the intermediate formation of complex addition compounds with metal salts including cuprous halides.

In the separation of aliphatic diolefins from complex hydrocarbon mixtures containing paraffins and olefins of similar boiling points, the thermally-reversible reaction between said diolefins and certain inorganic salts of monovalent heavy metals of Groups I and II of the periodic table is often utilized. With said inorganic salts, and particularly with cuprous halides such as the chloride or bromide, addition complexes may be formed which are separable from the hydrocarbon mixtures and which may be dissociated by simple treatment such as moderate heating to recover the diolefin.

The utilization of cuprous halide reagents to absorb diolefins involves the contact of the diolefin-containing hydrocarbon fluids with the metal salt in a liquid medium or in solid form at temperatures and reaction times which favor the formation of the diolefin-cuprous halide addition complex. This latter product being relatively insoluble in any solvents present is then segregated by suitable accessory means, or by the reagent itself in the case of solid-type reagents. Following this segregation of the intermediate reaction product, the diolefin is recovered by heating the addition complex to decomposition temperatures and collecting the evolved diolefin.

The purity of the diolefin thus recovered depends on the extent to which non-diolefinic hydrocarbons, whether chemically combined or mechanically retained, are separated from the addition complex prior to desorption of the diolefin. In the case of aqueous solutions of cuprous halides difficulties are encountered due to the retention of olefins and other reactive impurities by the reagent solution, and the problems connected with separating the diolefin addition complex. A substantial improvement is obtained through the use of solid-type reagents comprising adsorbent carriers impregnated with cuprous halides or mechanical mixtures of cuprous chloride with substantially non-adsorbent materials. Such reagents offer distinct advantages from the standpoint of stability, favorable reaction times, and more selective absorption of diolefins. Also, since the diolefin addition complex is retained by the reagent, mechanical separation problems are eliminated.

However, with these improvements in the absorption and complex separation steps, a certain amount of contamination of the recovered diolefin has been noted in the desorption step. This is apparently due to adsorption of unreacted hydrocarbons by the solid reagents from gaseous mixtures even at temperatures above the dew point of said mixtures, and in the case of treating hydrocarbon liquids, there is difficulty in completely vaporizing the unreacted feed stock prior to desorption by simply warming the reagent to vaporizing temperatures. While this source of contamination might be partly eliminated by evacuation of the reagent bed and/or the zone containing the diolefin addition complex, losses of diolefin are often occasioned by premature decomposition of said complex. Also, the provision of sub-atmospheric pressures for large vessels in commercial installation is both expensive and hazardous because of possible air contamination.

I have now discovered a method for conducting the diolefin desorption step in processes of the type described whereby unreacted hydrocarbon contaminants are substantially completely removed prior to desorption. My new method of operation results in the recovery of a higher yield of a purer product under more efficient and more easily controlled conditions. These and other objects and advantages of my process including the avoidance of subatmospheric pressures will be evident from the following disclosure.

In general the process of my invention contemplates the purification and decomposition of a diolefin-metal salt addition complex, which has been formed by addition-reaction with a solid complex-forming metal salt reagent with a suitable diolefin in order to recover the diolefin in a high state of purity. Preferably, the diolefin is of the conjugated type exemplified by butadiene, isoprene, piperylene, etc.

In one specific embodiment my process comprises the steps of removing mechanically-retained unreacted hydrocarbons from a cuprous halide reagent bearing a diolefin addition complex by the passage therethrough of a substantially non-condensible flush gas at temperatures below those causing decomposition of the complex, and then continuing the passage of the gas at volumes consistent with substantially constant low superatmospheric pressures while decomposing the complex and collecting the desorbed diolefin after separation of the flush gas.

While this process is generally applicable to the treatment of diolefin-cuprous halide complex compounds from other sources, it is of particular value in processes utilizing solid-type cuprous chloride reagents, and the arrangement of equipment for one such adaptation is illustrated in the drawing. This diagram shows provisions for treating hydrocarbons in either liquid or vapor phase through cuprous chloride reagent in a vessel connected for either upward or downward flow. Assuming that a $C_4$ hydrocarbon mixture is being treated in vapor phase and with upward flow through the reagent, the feed entering through line 1 passes through vaporizer 2 and thence through valve 4, and lines 5 and 6 to the reagent vessel 7. This vessel which may be an elongated tower or a number of relatively small diameter tubes is jacketed with a heat exchange medium in jacket 15, and during diolefin absorption a cooling medium is circulated to maintain optimum absorption temperatures.

The hydrocarbon vapors after passage through vessel 7 exit through line 8, valve 9 and line 10 with the absorbed diolefin being retained by the cuprous chloride reagent. When downward flow is being utilized the corresponding flow of hydrocarbons is through valve 11, line 12, line 8 and through the vessel 7, with the diolefin denuded fluid exiting through line 6, valve 13 and line 14.

After a predetermined amount of diolefin has been absorbed by the reagent in vessel 7 with the formation of diolefin-cuprous chloride complex, the hydrocarbon feed is either stopped or diverted to a second reagent vessel while the diolefin is recovered from vessel 7. The first step in this procedure is the removal of unreacted hydrocarbons from the reagent and the reagent vessel. A chemically inert, non-condensible flush gas of the type described below is admitted through pressure regulating valve 16 and passes through line 6, vessel 7, line 8, valve 9 and line 10 to a vent line which may include recovery apparatus for $C_4$ hydrocarbons if desired. This gas may be supplied through line 17 from an unrelated source (not shown) or it may be furnished from gas holder 18 by means of blower 19 and line 20. This latter arrangement is of particular use during diolefin desorption as will be explained below. While this flush gas is passing the cooling medium is usually withdrawn from jacket 15, although in some cases the temperature in the reagent vessel is not allowed to rise very much above absorption temperatures. With the butadiene-cuprous chloride complex on the reagent, temperatures in the neighborhood of 80 to 100° F. may be reached while passing the flush gas to remove adsorbed, unreacted hydrocarbons.

When the flushing is complete, as can be determined by tests for condensate in the effluent gas stream, the desorption of diolefin is begun by introducing a heating medium such as steam or heated water into jacket 15. When decomposition temperatures are reached evolution of gaseous diolefin commences, and during this period, the flush gas is passed through the vessel and, by closing valve 27 in exit line 10, through valve 21, condenser 22 and line 23 to separator 24. The separator gas may be vented through valve 28, or preferably may be recycled through valve 25 to supply vessel 18. In the latter arrangement, it is picked up by blower 19 and passed through line 20 to the admittance valve 16.

Valve 16 is usually regulated to maintain a constant low superatmospheric pressure on the reagent vessel and on the condensing and separating system, and as diolefin desorption begins with decomposition of the diolefin-cuprous chloride complex, the gas volume is proportionately decreased. The gaseous diolefin is condensed in condenser 22 and removed from separator 24 through line 26 to storage. Near the end of the desorption, the gas volume from valve 16 again increases, and the last traces of diolefin are rapidly removed from the reagent bed and are recovered. The reagent is then cooled and is ready for further service in diolefin absorption.

Many modifications of the arrangements described may be made within the terms of my invention. Thus, additional heating and/or cooling means may be installed in the flush gas line to facilitate the heating and cooling of the reagent bed. Or the flush gas may be recycled even prior to desorption provided that the non-diolefinic hydrocarbon contaminants flushed from the reagent are not retained in the recycled gas stream. Contaminants such as $C_4$ and $C_5$ paraffins and olefins and the like may be removed from the gas stream by compression and/or absorption methods similar to natural gasoline recovery operations.

Also, while the drawing shows the desorption step operated with both flush gas and diolefins removed from the top of the reagent vessel, this flow may be reversed or alternated, if desired. Or, in treating liquid hydrocarbons the flushing step may be downward to obtain a certain degree of gravity drainage, while desorption may be conducted from either end of the reagent vessel. These and other modifications will be obvious from the accompanying disclosure.

The length of the flushing period may vary somewhat with the boiling range of the feed stock and the nature of the reagent. A reagent which consists of an adsorbent carrier such as bauxite, charcoal or silica gel bearing cuprous chloride may retain a much greater amount of either liquid or gaseous hydrocarbons than one consisting of a substantially non-adsorbent material such as asbestos or cellulose fiber or sawdust mixed with cuprous chloride. The volume and rate of flow of the flush gas is ordinarily selected in accordance with these factors to give substantially complete removal of the unreacted mechanically adsorbed hydrocarbons in the shortest feasible period in order to rapidly complete the desorption step and prepare the reagent for absorption service.

The temperatures during the flushing period are regulated well below those causing complex decomposition, so that no loss of diolefin will occur. Of course, once the gas stream is directed to the recovery system, temperature control is less important. Ordinarily temperatures are chosen which will expedite the vaporization and/or removal of adsorbed hydrocarbons and may range from diolefin absorption temperature of 0 to 80° F. up to incipient diolefin evolution at temperatures of 120° F. or higher. During the period of rapid diolefin desorption temperatures of 120 to 200° F. or higher are usually employed, depending on the diolefin being recovered and on the pressure in the reagent vessel during desorption.

In the step of decomposing the diolefin cuprous halide complex by heat, the rate of decomposition is affected by both the temperature and the pressure. With the butadiene-cuprous chloride complex, very rapid decomposition occurs at temperatures of 180 to 210° F. and at atmospheric pressure. Small increases in the pressure such as the values of 1 to 15 pounds gage I have found useful during desorption may cause slight increases in the temperatures required for equivalent decomposition rates. However, desorption is satisfactorily rapid at temperatures not usually exceeding about 210° F., particularly since the initial and final stages are appreciably shortened by the passage of flush gas during the entire operation. With other complexes such as the isoprene and piperylene compounds, desorption temperatures are generally lower, but the same principles are applicable to the steps of diolefin recovery.

By maintaining a relatively constant superatmospheric pressure during the desorption step, I am able to effect a much more uniform rate of diolefin evolution and to control the recovery of diolefin liquid in a more satisfactory manner. The increased pressure is of great benefit in the condensation of the evolved vapors, particularly in the case of butadiene. Thus, the rate and extent of cooling in the condenser is reduced, and excessive refrigeration is avoided without any losses of valuable product. Further, any traces of diolefin carried in the recycled gas stream would be eventually recovered by this arrangement.

Pressures during the flushing and desorption steps are usually only slightly above atmospheric, and sufficient to prevent inward leakage of air into vessels, valves, and lines and connections. When treating $C_4$ hydrocarbons to recover butadiene these pressures may range from zero to 15 pound gage or even higher with a maximum of 10 to 15 pounds gauge usually preferred. When mixtures to be treated comprise $C_5$ or higher-boiling hydrocarbons, similar pressures are suitable for the desorption step, although substantially atmospheric pressures are often employed in the flushing step to remove the less volatile constituents at lower temperatures.

The gases which are suitable for my process are those substantially non-condensible at the pressures and temperatures employed and easily separable from diolefin condensates. These gases are also substantially oxygen-free and inert toward the hydrocarbons and the absorption reagents under all the conditions employed. Specific examples are, nitrogen, carbon dioxide, methane, ethane, or natural gas mixtures containing major proportions of methane. Obviously mixtures of these gases are suitable, and when natural gas compositions are employed, reactive impurities are first removed. Gases containing propane may also be used, as long as this higher-boiling material does not condense or otherwise interfere with the separation of the liquid diolefin product. The choice of a flush gas will depend to a large extent on location and availability, and total recycling may be economical when nitrogen or similarly expensive mixtures are utilized.

The following specific applications of my process will serve to further illustrate its operation and advantages.

Example I

A $C_4$ hydrocarbon liquid containing butadiene along with some butane and major amounts of normal butenes was treated in liquid phase over a reagent consisting of charcoal impregnated with 40 per cent by weight of cuprous chloride. The absorption was carried out at 40° F. and when the reagent bed had absorbed a calculated quantity of butadiene, the flow was stopped, the liquid in the reagent vessel was vaporized at a temperature just above the absorption temperature, and methane gas at about 80° F. was passed through the bed until condensation tests showed substantially no furthter removal of $C_4$ hydrocarbons.

The reagent was then heated with a stream of methane passing through the bed and through a condenser and separator. The reagent vessel and condenser pressure was maintained at about 5 pounds gage while the reagent was heated to 200° F. The butadiene was rapidly and completely evolved and recovered with a purity of 99 per cent.

When the same reagent was desorbed after merely attempting to remove all the unreacted hydrocarbons by vaporization at 100° F., the desorbed butadiene was only 75 per cent pure.

Example II

A gas mixture of $C_3$ and $C_4$ hydrocarbons was treated over a reagent consisting of cuprous chloride and asbestos fiber at a temperature of 40° F. for the absorption of butadiene contained therein. After the reagent had become spent with respect to butadiene the flow of hydrocarbons was stopped, and natural gas containing only traces of propane and no higher boiling material was passed through the reagent at 90° F. until no condensate was detectable in the effluent gas stream. The reagent was then heated to 210° F. with the gas stream passing through a condenser and separator with a back-pressure of about 10 pounds gage. The gas was separated and vented, while the diolefin condensate was recovered in substantially pure form.

Example III

A mixture of butene-2 and butadiene, containing 15 volume per cent of diolefin was treated in vapor phase over a reagent consisting of a mixture of cuprous chloride and oil-impregnated sawdust at 45° F. and substantially non-condensing conditions. The flow of feed vapors was stopped when the reagent had accumulated nearly the maxium amount of diolefin addition complex and the reagent was desorbed at 190° F. to recover a diolefin concentrate containing 92 per cent butadiene.

After an identical absorption step with the same charge and reagent, nitrogen gas was passed through the bed of reagent and diolefin addition complex at 90° F. and a flow of 0.5 gas volume per minute per volume of reagent until all condensible hydrocarbons were flushed from the reagent vessel. The flushing gas stream was then passed through a condenser and separator with a back-pressure of one pound gage on the separator while butadiene was desorbed by heating the reagent to 190° F. The nitrogen gas was recycled continuously during desorption, and the butadiene was condensed and separated with a purity of over 99 per cent.

While the foregoing exemplary operations have illustrated specific applications of my process numerous modifications and extensions within the scope of the invention are possible.

I claim:

1. In a process for the recovery of aliphatic conjugated diolefins from hydrocarbon mixtures containing the same and close-boiling non-diolefinic hydrocarbons of substantially the same boiling range by intimately contacting said mixture with a reagent containing a cuprous halide and thereby causing said diolefin to selectively react with said cuprous halide to form a solid diolefin-cuprous halide complex mechanically retaining unreacted non-diolefinic hydrocarbons, and thereafter desorbing the diolefin from said solid complex by heating same to an elevated temperature, the improvement which comprises removing substantially all of said unreacted non-diolefinic hydrocarbons retained in said solid complex prior to desorption thereof by passing through a mass of said solid complex a stream of inert oxygen-free gas which is non-condensible at the pressures and temperatures employed in this step and in the desorption step hereinafter-recited and which is easily separable in a gaseous form from said diolefin by condensation of the latter, carrying out said last-named step at at least atmospheric pressure and at temperatures below those causing appreciable desorption of diolefin from said complex, thereafter effecting said desorbing step by passing through said mass of solid complex a stream of said inert gas while heating said complex to a temperature sufficiently high to effect desorption of said diolefin therefrom and while maintaining substantially constant low superatmospheric pressure, removing the resulting mixture of diolefin and said inert gas, and separating said diolefin in substantially pure form from said mixture by subjecting said mixture to conditions causing condensation of said diolefin while allowing said inert gas to remain as such.

2. The process of claim 1 wherein said gas is methane.

GRAHAM H. SHORT.